(12) United States Patent
West

(10) Patent No.: US 8,833,682 B2
(45) Date of Patent: Sep. 16, 2014

(54) FISH CARCASS DISPOSAL SYSTEM

(71) Applicant: University of Alaska Anchorage, Anchorage, AK (US)

(72) Inventor: Alexandra Elizabeth West, Anchorage, AK (US)

(73) Assignee: University of Alaska Anchorage, Anchorage, AK (US)

( * ) Notice: Subject to any disclaimer, the term of this patent is extended or adjusted under 35 U.S.C. 154(b) by 0 days.

(21) Appl. No.: 13/917,739

(22) Filed: Jun. 14, 2013

(65) Prior Publication Data

US 2013/0341440 A1  Dec. 26, 2013

Related U.S. Application Data

(60) Provisional application No. 61/660,290, filed on Jun. 15, 2012.

(51) Int. Cl.
| | |
|---|---|
| *B02C 18/00* | (2006.01) |
| *B02C 9/04* | (2006.01) |
| *A22C 25/20* | (2006.01) |
| *A22B 7/00* | (2006.01) |
| *B02C 18/24* | (2006.01) |
| *F03B 13/00* | (2006.01) |
| *B02C 18/14* | (2006.01) |

(52) U.S. Cl.
CPC ............. *B02C 18/0084* (2013.01); *A22C 25/20* (2013.01); *A22B 7/008* (2013.01); *B02C 18/24* (2013.01); *F03B 13/00* (2013.01); *B02C 18/142* (2013.01)
USPC ........................... 241/30; 241/101.2; 241/236

(58) Field of Classification Search
USPC ......................... 241/30, 101.2, 236
See application file for complete search history.

(56) References Cited

U.S. PATENT DOCUMENTS

| | | | | |
|---|---|---|---|---|
| 3,266,543 | A | * | 8/1966 | Paoli ............................... 241/14 |
| 4,779,811 | A | * | 10/1988 | Takasaki ....................... 241/293 |
| 5,713,788 | A | * | 2/1998 | Ferket et al. .................. 452/138 |
| 6,053,441 | A | * | 4/2000 | Danforth et al. ........... 241/46.11 |
| 6,547,172 | B2 | * | 4/2003 | Reinders et al. ................ 241/57 |
| 7,823,811 | B2 | * | 11/2010 | Mosley et al. .................. 241/21 |
| 2002/0074438 | A1 | * | 6/2002 | Horigane ....................... 241/236 |
| 2003/0006327 | A1 | * | 1/2003 | Ryu ............................... 241/159 |

* cited by examiner

*Primary Examiner* — Faye Francis
(74) *Attorney, Agent, or Firm* — Ballard Spahr LLP

(57) ABSTRACT

A water-powered fish carcass disposal system that floats in a body of water, grinds fish carcasses into pieces having a desired size, and returns the pieces of the ground fish carcasses into the body of water.

20 Claims, 8 Drawing Sheets

FISH CARCASS DISPOSAL SYSTEM

CROSS-REFERENCE TO RELATED PATENT APPLICATIONS

This application claims the benefit of the filing date of U.S. Provisional Patent Application No. 61/660,290, filed Jun. 15, 2012, which is hereby incorporated by reference herein in its entirety.

FIELD

This application relates generally to systems and methods for disposing of fish carcasses.

BACKGROUND

In major fishing zones along rivers, fishermen often discard fish carcasses (either whole or in parts) along the banks of the rivers or into the rivers. Even the fish carcass parts that are discarded into the rivers may ultimately wind up on the river banks after they are caught in eddy currents and slower currents. These fish carcasses have a potent smell that lures large predators, such as bears, toward the river banks, increasing the likelihood of dangerous animal-human interactions.

Accordingly, there is a need in the pertinent art for a fish carcass disposal system that disposes of fish carcasses in a manner that does not attract large predators and that returns the nutrients from fish carcasses to the river ecosystem.

SUMMARY

Described herein is a fish disposal system having a paddlewheel and a grinder. The paddlewheel floats within a body of water, such as a river, and has a wheel portion that is configured for rotation in response to current flow within the body of water. The grinder has a plurality of cutting elements, which optionally can be interleaved. Each cutting element of the plurality of cutting elements can be configured for rotation about a respective grinding axis. The plurality of cutting elements can be operatively mechanically coupled to the wheel portion of the paddlewheel such that rotation of the wheel portion about the rotation axis effects a corresponding rotation of each cutting element about its respective grinding axis. Alternatively, the fish disposal system can include an electrical generator that is operatively coupled to and positioned between the wheel portion of the waterwheel and the plurality of cutting elements of the grinder, with the electrical generator being configured to translate rotational motion of the wheel portion into electricity that is used to electrically power the rotation of the cutting elements of the grinder. The plurality of cutting elements can define a grinding zone that receives one or more fish carcasses and an exit zone that receives pieces of the ground fish carcasses. The exit zone can be in fluid communication with the body of water.

BRIEF DESCRIPTION OF THE DRAWINGS

These and other features of the preferred embodiments of the invention will become more apparent in the detailed description in which reference is made to the appended drawings wherein.

DETAILED DESCRIPTION

Figure 1:
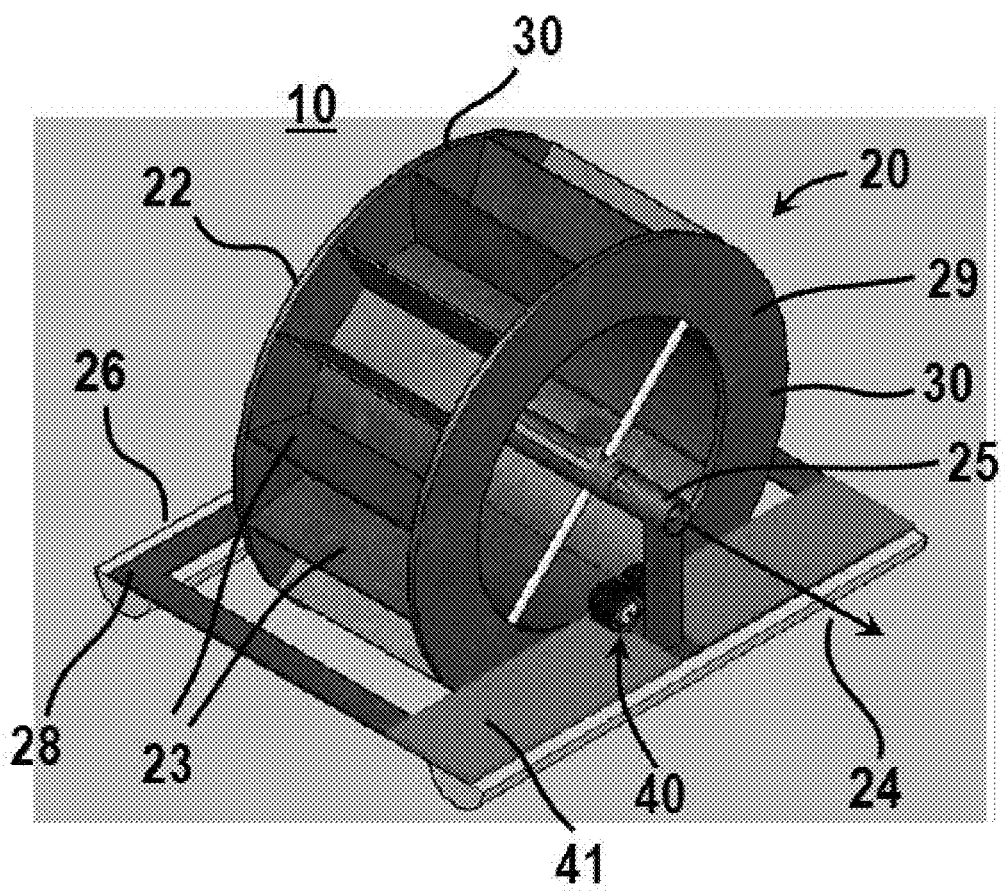
FIG. 1 depicts an exemplary fish disposal system having a waterwheel and a grinder as described herein.

The present invention can be understood more readily by reference to the following detailed description, examples, drawings, and claims, and their previous and following description. However, before the present devices, systems, and/or methods are disclosed and described, it is to be understood that this invention is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description of the invention is provided as an enabling teaching of the invention in its best, currently known embodiment. To this end, those skilled in the relevant art will recognize and appreciate that many changes can be made to the various aspects of the invention described herein, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

As used throughout, the singular forms "a," "an" and "the" include plural referents unless the context clearly dictates otherwise. Thus, for example, reference to "an inlet" can include two or more such inlets unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, the terms "optional" or "optionally" mean that the subsequently described event or circumstance may or may not occur, and that the description includes instances where said event or circumstance occurs and instances where it does not.

The word "or" as used herein means any one member of a particular list and also includes any combination of members of that list.

Described herein with reference to FIGS. 1-7 is a fish disposal system 10 comprising a paddlewheel 20 and a grinder 40. The paddlewheel 20 is configured for flotation within a body of water, such as, for example and without limitation, a river. In exemplary aspects, and with reference to FIG. 1, the paddlewheel 20 can comprise a plurality of pontoons 26 to preserve flotation and stability of the fish disposal system 10 within the body of water. It is further contemplated that the plurality of pontoons 26 can permit positioning of the fish disposal system 10 in an area of higher current than areas closest to the banks of the body of water. In these aspects, it is contemplated that the grinder 40 can optionally be secured to at least one pontoon of the plurality of pontoons 26. Optionally, the paddlewheel 20 can comprise a support frame 28 secured thereon the plurality of pontoons 26. It is contemplated that the support frame 28 can form a substantially contiguous rectangular structure around the periphery of the paddlewheel 20. In one exemplary aspect, the support frame 28 can have a length of about 14 feet and a width of about 12 feet. It is contemplated that the grinder 40 can optionally be secured to the support frame 28. In additional exemplary aspects, the paddlewheel 20 can be configured for coupling (e.g., tethering) to a bank proximate the body of water and/or a stationary object securely positioned on such a bank. In these aspects, it is contemplated that the grinder 40 can also be configured for coupling (e.g., tethering) to the bank and/or a stationary object securely positioned on the bank. In other exemplary aspects, it is contemplated that the grinder 40 can comprise a grinder platform 41 that is secured thereto a pontoon 26 and/or support frame 28 of the paddlewheel 20. In these aspects, the grinder platform 41 can provide additional support to the grinder 40.

Figure 2:
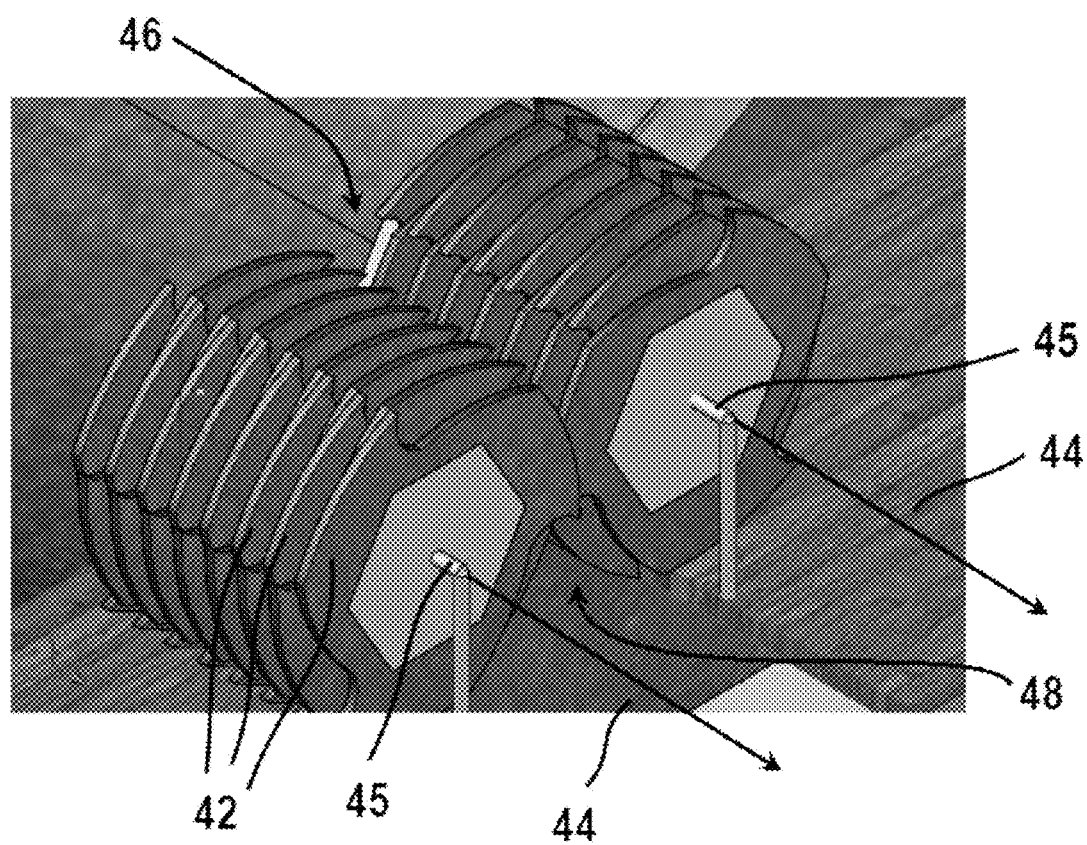
FIG. 2 depicts an exemplary grinder having a plurality of interleaved cutting elements as described herein.

In one aspect, as shown in FIGS. 1 and 2, the paddlewheel 20 can comprise a wheel portion 22. In this aspect, the wheel portion 22 of the paddlewheel 20 can be configured for rotation about a rotation axis 24. It is contemplated that the paddlewheel 20 can further comprise a central shaft 25 that is substantially aligned with the rotation axis 24 and operatively coupled to the wheel portion 22 of the paddlewheel 20. It is further contemplated that the wheel portion 22 of the paddlewheel 20 can be configured for rotation about the rotation axis 24 in response to current flow within the body of water. In exemplary aspects, the wheel portion 22 can comprise at least one circumferential frame 29 that defines an operative diameter of the wheel portion 22 and that surrounds the rotation axis 24. In these aspects, as shown in FIG. 1, the circumferential frame 29 can optionally comprise a plurality of spaced, axially aligned circumferential members 30. In another aspect, the wheel portion 22 can comprise a plurality of paddles 23 operably coupled to the circumferential frame 29 and configured to periodically and/or cyclically engage water as the wheel portion rotates about the rotation axis 24. In this aspect, it is contemplated that at least a portion of the wheel portion 22 (e.g., at least one paddle 23) can remain engaged with and/or underneath a top surface of the body of water at all times, as is typically done with an undershot waterwheel. It is further contemplated that each paddle 23 of the plurality of paddles can have a desired cross-sectional area, a desired length, a desired width, and/or a desired depth within the body of water.

In exemplary aspects, it is contemplated that the diameter of the wheel portion 22 of the paddlewheel 20 can range from about 5 feet to about 15 feet and, more preferably, range from about 6 feet to about 14 feet. In other exemplary aspects, it is contemplated that the plurality of paddles 23 can comprise between 10 and 30 paddles and, more preferably, at least 16 paddles. In these aspects, it is contemplated that a desired circumferential spacing between adjacent paddles 23 of the plurality of paddles can range from about 0.75 feet to about 2.50 feet. In additional exemplary aspects, it is contemplated that the paddle depth (portion of the paddle that enters into the body of water) for each paddle 23 of the plurality of paddles can range from about 0.75 feet to about 2.50 feet. However, it is contemplated that the paddle depth is preferably greater than the circumferential paddle spacing. In further exemplary aspects, it is contemplated that the desired width of each paddle 23 of the plurality of paddles (extending radially away from the rotation axis 24) can range from about 0.25 feet to about 4.50 feet. In one exemplary aspect, for a body of water having a current velocity of about 4 feet/second, it is contemplated that the desired length of each paddle 23 of the plurality of paddles (extending substantially parallel to the rotation axis 24) can be about 6 feet, the desired width of each paddle of the plurality of paddles can be about 2.5 feet, and the diameter of the wheel portion 22 can be about 13.5 feet, generating at least about 3.5 kW in power (without factoring in gearing between paddlewheel and grinder). In exemplary aspects, it is contemplated that, in order to efficiently generate sufficient power for operation of the grinder 40 as described herein, the wheel portion 22 of the paddlewheel 20 can be configured for rotation at a velocity that is at least about two-thirds of the speed of the current of the body of water contacting the plurality of paddles 23 of the wheel portion.

Optionally, in exemplary aspects, the wheel portion 22 of the paddlewheel 20 can be selectively liftable and/or removable relative to the remainder of the paddlewheel and the body of water. In these aspects, it is contemplated that the wheel portion 22 can be lifted up by accessing the paddlewheel 20 (likely by boat), cranking a lever that is selectively coupled to the wheel portion using conventional means, thereby lifting the wheel portion from the water and stopping activation of the grinder. In other exemplary aspects, it is contemplated that the entire fish disposal system 10 can be removable from the body of water, such as, for example, during winter months when the body of water will be frozen.

Figure 3A:
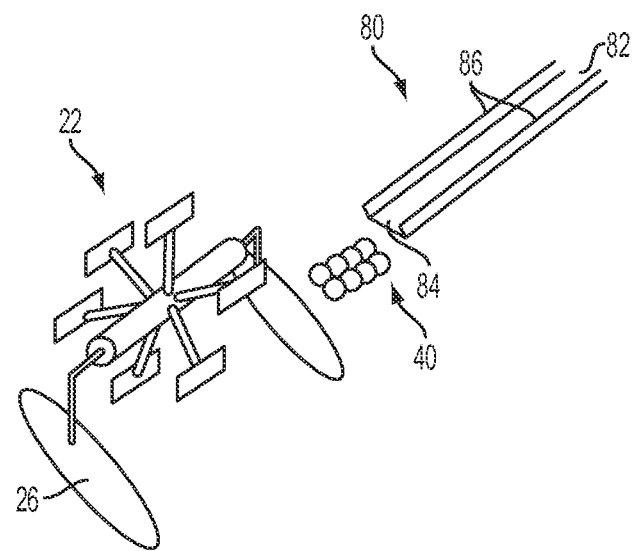
FIGS. 3A-3C depict an exemplary gear assembly for mechanically coupling a waterwheel to a grinder, as described herein.
Figure 3B:
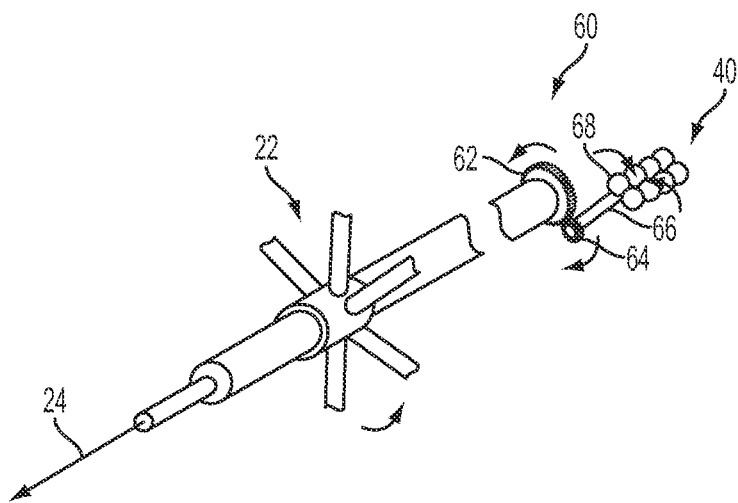
Figure 3C:
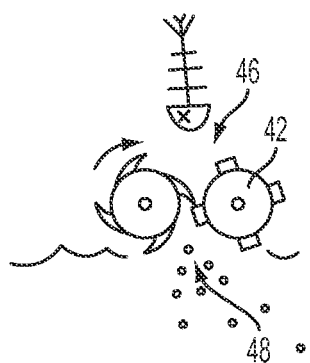

In another aspect, as shown in FIGS. 1-3, the grinder 40 can comprise a plurality of cutting elements 42. In exemplary aspects, the plurality of cutting elements 42 can be positioned in an interleaved and/or overlapping orientation, as depicted in FIG. 2. In these aspects, it is contemplated that at least one cutting element 42 of the plurality of cutting elements can be offset from the other cutting elements of the plurality of cutting elements. Alternatively, the plurality of cutting elements 42 can be substantially axially aligned. It is contemplated that adjacent cutting elements 42 of the plurality of cutting elements can be spaced from one another by a separation distance. In one aspect, it is contemplated that the maximum separation distance between adjacent cutting elements 42 can be about 0.50 inches, thereby ensuring that the cutting elements grind the fish carcasses into pieces of no larger than about 0.50 inches. In an additional aspect, each cutting element 42 of the plurality of cutting elements can be configured for rotation about a respective grinding axis 44. Thus, in exemplary aspects where the plurality of cutting elements 42 are substantially axially aligned, the plurality of cutting elements can be configured for rotation about a single (common) grinding axis 44. In exemplary aspects where the plurality of cutting elements 42 are offset, at least one cutting element of the plurality of cutting elements can be configured for rotation about a grinding axis 44 that is not axially aligned (i.e., not co-axial) with the grinding axis of at least one other cutting element. For example, in one aspect, the plurality of cutting elements 42 can comprise first and second groups of cutting elements, with the first group being configured for rotation about a first grinding axis and the second group being configured for rotation about a second grinding axis. In these exemplary aspects, it is contemplated that the cutting elements 42 of the first group can be positioned between adjacent cutting elements of the second group in an interleaving and/or overlapping fashion, as shown in FIG. 2. It is further contemplated that the first and second grinding axes can be substantially parallel. It is still further contemplated that the first and second groups of cutting elements can be secured using respective shafts 45 that are configured for rotation about the first and second grinding axes, respectively. In additional exemplary aspects, it is contemplated that rotation of the cutting elements 42 as described herein can effectively pull the fish carcasses through the cutting elements toward an exit zone 48 of the grinder, as further described herein.

Optionally, in a further aspect, and with reference to FIGS. 1-3 and 7, the plurality of cutting elements 42 can be operatively coupled to the paddlewheel 20 such that rotation of the wheel portion 22 of the paddlewheel about the rotation axis 24 effects a corresponding rotation of the plurality of cutting elements 42 about their respective grinding axes 44. In this aspect, and with reference to FIG. 3, it is contemplated that the wheel portion 22 of the paddlewheel 20 can be mechanically coupled to the plurality of cutting elements through a gear assembly 60. For example, it is contemplated that the wheel portion 22 can comprise a first gear 62 coupled to a central shaft 25 of the wheel portion and a second gear 64 rotationally coupled to the first gear and secured to a drive rod 66, which in turn is coupled to at least two gears 68 that are rotationally coupled to the plurality of cutting elements 42 of the grinder 40. It is still further contemplated that a gear ratio between one or more of the gears 62, 64 of the wheel portion and one or more of the gears 68 of the grinder can be selectively varied to achieve a desired power output as described herein.

Optionally, in another aspect, it is contemplated that the fish disposal system 10 can further comprise an electrical generator 90. In this aspect, it is contemplated that the electrical generator 90 can be operatively coupled to the wheel portion 22 of the paddlewheel 20. In an additional aspect, the electrical generator 90 can be configured to translate the rotational motion of the wheel portion 22 of the paddlewheel 20 into electricity. In this aspect, it is contemplated that the plurality of cutting elements 42 can be electrically coupled to the electrical generator 90. It is further contemplated that application of electricity from the electrical generator 90 to the plurality of cutting elements 42 can effect rotation of the plurality of cutting elements about their respective grinding axes 44. It is still further contemplated that the electrical generator 90 can be selectively activated to apply electricity to the plurality of cutting elements 42 during usage of the fish disposal system 10.

In additional exemplary aspects, the plurality of cutting elements 42 can comprise substantially circular blades having one or more extensions, as shown in FIG. 2. However, it is contemplated that the cutting elements 42 can comprise any known cutting element or blade that is capable of grinding fish remains as described herein.

In a further aspect, the plurality of cutting elements 42 can define a grinding zone 46 configured to receive one or more fish carcasses. In still a further aspect, the plurality of cutting elements 42 can comprise an exit zone 48 configured to receive pieces of the ground fish carcasses (following passage through the plurality of cutting elements of the grinder). In this aspect, it is contemplated that the exit zone 48 can be in fluid communication with the body of water.

Figure 4:
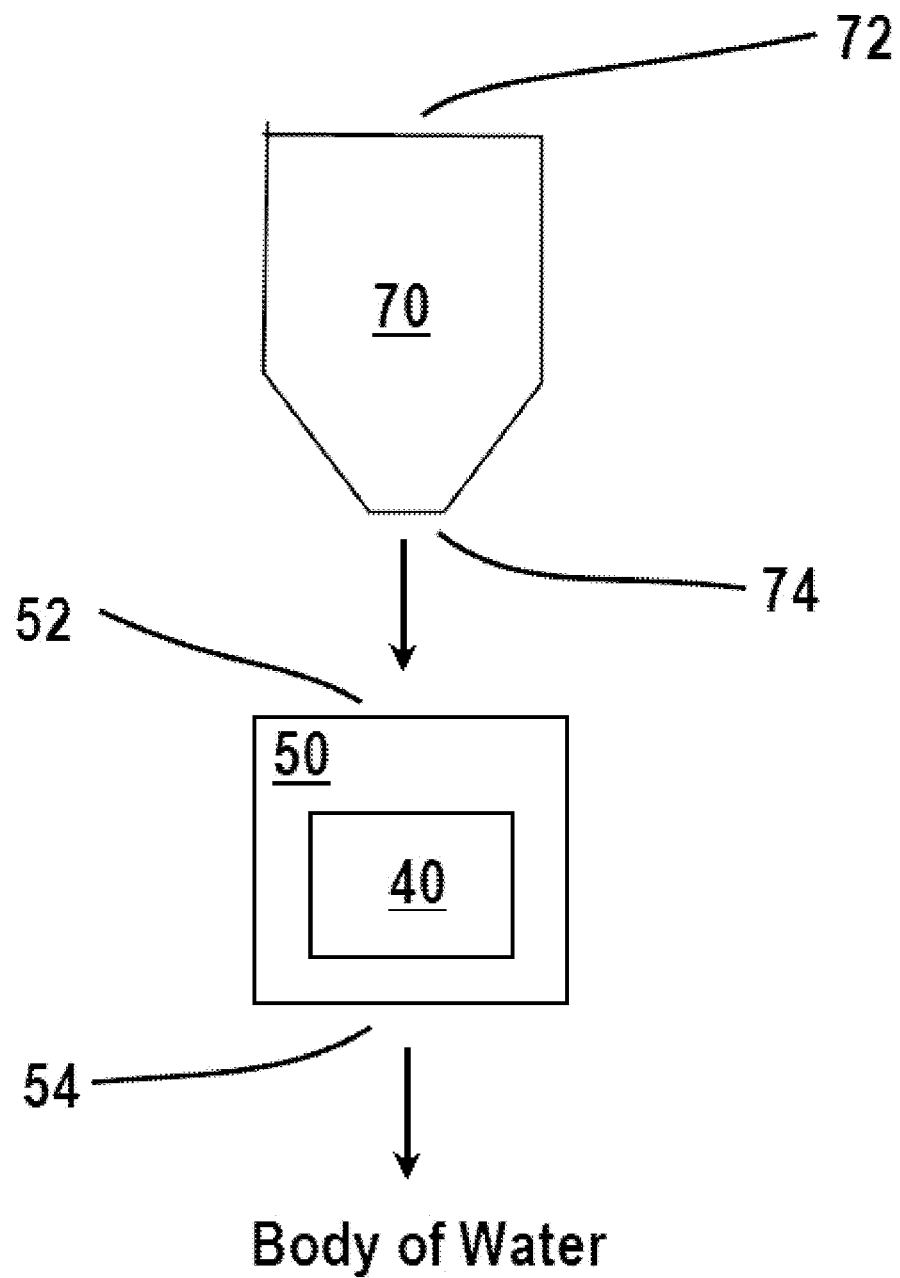
FIG. 4 is a schematic diagram depicting an exemplary hopper and grinder housing, as described herein.

Optionally, in one aspect, and with reference to FIG. 4, the grinder 40 can comprise a housing 50 having an inlet 52 and an outlet 54. In this aspect, it is contemplated that the inlet 52 of the housing 50 of the grinder 40 can be in communication with the grinding zone 46 of the plurality of cutting elements 42. It is further contemplated that the outlet 54 of the housing 50 of the grinder 40 can be in communication with the exit zone 48 of the plurality of cutting elements 42.

Figure 6:
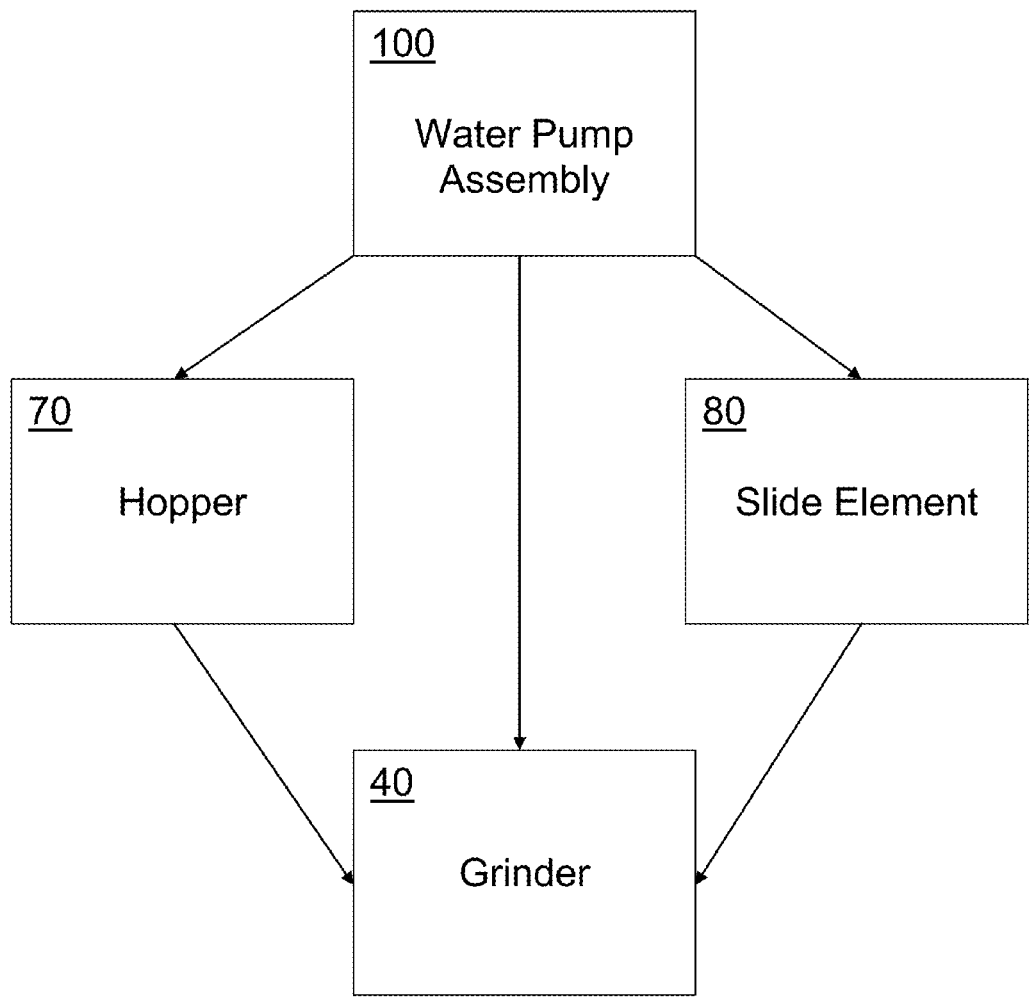
FIG. 6 is a schematic diagram depicting an exemplary coupling arrangement between a water pump assembly, a grinder, a hopper, and a slide, as described herein.
Figure 7:
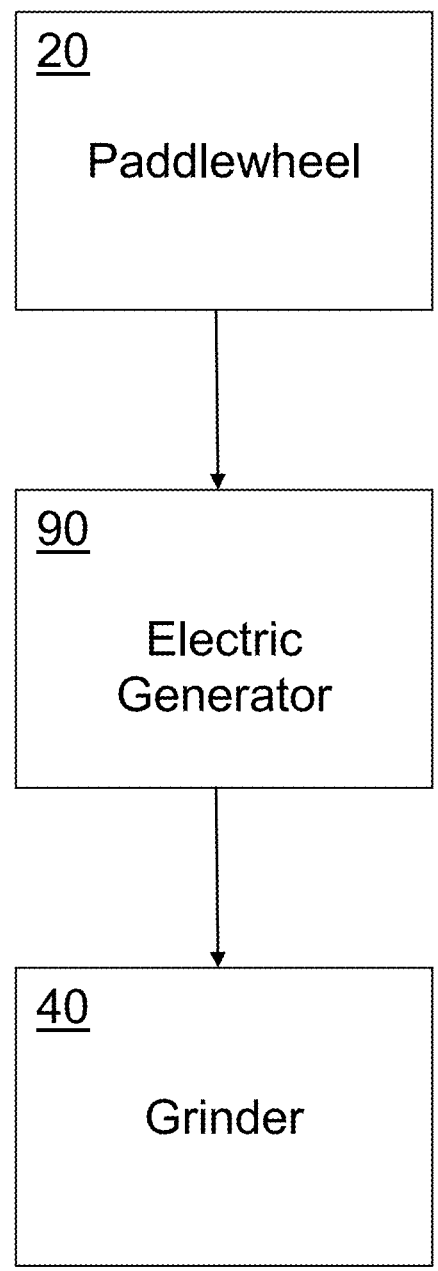
FIG. 7 is a schematic diagram depicting an exemplary electrical coupling arrangement between an electrical generator, a wheel portion of a paddlewheel, and a grinder, as described herein.

Optionally, in another aspect, and with reference to FIGS. 4 and 6, the fish disposal system 10 can further comprise a hopper 70 having an inlet 72 and an outlet 74. In this aspect, it is contemplated that the inlet 72 of the hopper 70 can be configured to receive the one or more fish carcasses. It is further contemplated that the outlet 74 of the hopper 70 can be in communication with the grinding zone 46 of the plurality of cutting elements 52 of the grinder 40. In exemplary aspects, the inlet 72 of the hopper 70 can be configured to permit entry of a selected number and/or volume of fish carcasses into the hopper. Optionally, in these aspects, it is contemplated that the selected number and/or volume of fish carcasses can substantially correspond to entry of a single fish carcass into the hopper 70 at a given time. Alternatively, in other optional aspects, it is contemplated that the selected number and/or volume of fish carcasses can substantially correspond to concurrent entry of a plurality of fish carcasses into the hopper 70 at a given time.

Optionally, in an additional aspect, and with reference to FIG. 3A, the fish disposal system 10 can further comprise a slide element 80 having an inlet portion 82 and an outlet portion 84. In this aspect, the inlet portion 82 of the slide element 80 can be configured to receive the one or more fish carcasses, and the outlet portion 84 of the slide element 80 can be configured for secure positioning in communication with at least the grinding zone 46 of the plurality of cutting elements 42. For example, in exemplary aspects, when the fish disposal system 10 comprises a grinder 40 having a housing, the outlet portion 84 of the slide element 80 can be configured for secure positioning in communication with—and/or be coupled to—the inlet 52 of the housing 50 of the grinder 40. In other exemplary aspects, when the fish disposal system 10 comprises a hopper 70, the outlet portion 84 of the slide element 80 can be configured for secure positioning in communication with—and/or be coupled to—the inlet 72 of the hopper 70. In these aspects, it is contemplated that the outlet portion 84 of the slide element 80 can be pivotally coupled to the inlet 72 of the hopper 70 using a hinge, a removable pin, and/or other conventional pivotal fasteners. It is further contemplated that the inlet 72 of the hopper 70 and the outlet portion 84 of the slide element 80 can define respective openings that are configured to receive at least a portion of the removable pin. It is still further contemplated that the slide element 80 can be detached from the paddlewheel 20 following removal of the hinge and/or pin.

In a further aspect, it is contemplated that the inlet portion 82 of the slide element 80 can be configured for secure attachment to a stationary object positioned on a bank proximate the body of water, such as, for example and without limitation, a fish cleaning table. In this aspect, it is contemplated that the inlet portion 82 of the slide element 80 can be pivotally attached to the stationary object (e.g., through a hinged attachment) such that the slide is configured to rise with a rise in water level. In another aspect, the slide element 80 can define first and second side walls 86 extending from the inlet portion 82 to the outlet portion 84 along the operative length of the slide element. In this aspect, it is contemplated that the first and second side walls 86 can have a selected height (such as, for example, about six inches) to prevent loss of fish carcass remains as the fish carcasses travel along the slide element 80. In use, it is contemplated that the slide element 80 can permit fishermen to dispose of fish carcasses from a distance without having to closely approach the paddlewheel 20 and/or grinder 40.

Figure 5:
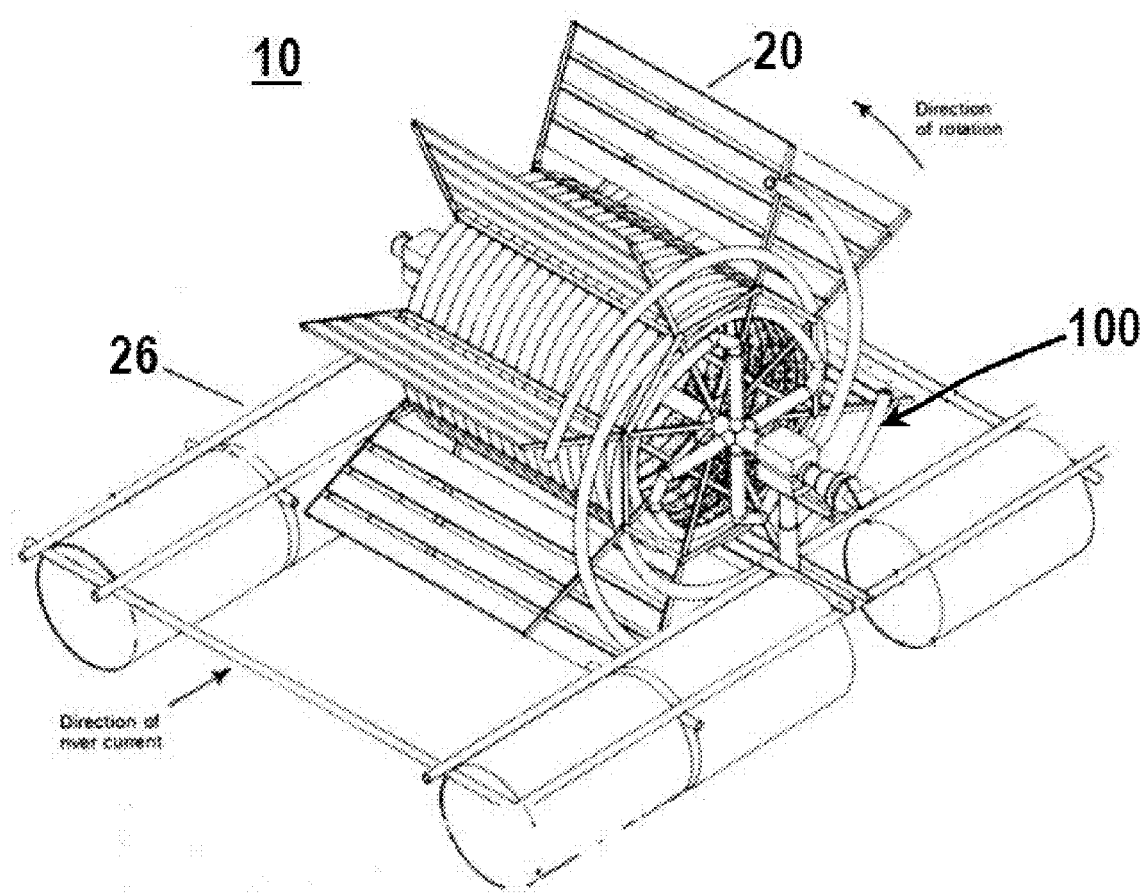
FIG. 5 depicts an exemplary waterwheel having a water pump assembly as described herein.

Optionally, in a further aspect, and with reference to FIGS. 5-6, the fish disposal system 10 can comprise a water pump assembly 100. In this aspect, and as shown in FIG. 6, it is contemplated that the water pump assembly 100 can be configured to pump water to one or more of (a) the grinding zone 46 of the plurality of cutting elements 42 of the grinder 40; (b) the inlet 52 of the housing 50 of the grinder 40 (when present); (c) the slide element 80 (when present); and (d) the inlet 72 of the hopper 70 (when present). It is further contemplated that the water applied by the water pump assembly 100 can be used to clean the cutting elements 42 of the grinder 40 and/or assist in the transport of the one or more fish carcasses. In exemplary aspects, the water pump assembly 100 can be a siphoning system as is known in the art. In other exemplary aspects, as shown in FIG. 5, the water pump assembly 100 can have a noria configuration and comprise a plurality of tubes that are circumferentially positioned about the rotation axis 24 of the wheel portion 22 of the paddlewheel 20 and configured to intake water from the body of water during rotation of the wheel portion. The plurality of tubes can be in fluid communication with a delivery tube configured to deliver the water to a selected location, such as those described above.

In exemplary aspects, it is contemplated that the wheel portion 22 of the paddlewheel 20 can optionally be formed from stainless steel, such as, for example and without limitation, A36 steel. It is further contemplated that connections within the wheel portion 22 can be made through welding or through the use of conventional bolts or bearings, with bearings providing improved efficiency. In other aspects, it is contemplated that the grinder platform 41 can comprise at least one of wood and steel sheets. In still other aspects, it is contemplated that the support frame 28 of the paddlewheel can comprise steel.

It is contemplated that the paddlewheel 20 disclosed herein can have one or more of the components, elements, or features of the paddlewheels described in U.S. Pat. No. 3,984,698 and U.S. Pat. No. 6,616,403, each of which is expressly incorporated herein by reference in its entirety. It is further contemplated that the grinder 40 disclosed herein can have one or more of the components, elements, or features of the grinding apparatus described in U.S. Pat. No. 7,080,650 and U.S. Pat. No. 7,383,843, each of which is expressly incorporated herein by reference in its entirety.

It is contemplated that particular characteristics and/or measurements of the various components of the fish disposal system 10 can be selectively varied depending upon the specific environment and body of water in which the fish disposal system is employed. For example, at least one of the diameter of the wheel portion 22 of the paddlewheel 20, the dimensions and/or surface area of the paddles 23, depth of the paddles underneath the body of water, the number of paddles, circumferential spacing of paddles, pontoon 26 and/or support 28 dimensions, the number of cutting elements 42 of the grinder 40, the spacing between cutting elements of the grinder, the gear ratio between the gears 62, 64, 68 of the gear assembly 60, the gear orientation, and the type of cutting element can be selectively varied depending upon the specific end use of—and water flow conditions encountered by—a fish disposal system as described herein. It is further contemplated that the overall fish disposal system 10 can be scalable depending upon the expected required power output and the volume of usage of the system that is expected.

In use, the disclosed fish disposal systems can be used to provide a method of disposing of fish carcasses in a safe and efficient manner along a body of water. For example, in various aspects, a paddlewheel can be positioned at a selected location within the body of water. The paddlewheel can be operatively coupled to a grinder as disclosed herein. In another aspect, the method can comprise delivering one or more fish carcasses to the grinding zone defined by the plurality of cutting elements of the grinder. When the fish disposal system comprises an electrical generator, it is contemplated that the method can further comprise selectively activating the electrical generator and/or grinder to effect grinding of the one or more fish carcasses as disclosed herein.

It is contemplated that the described fish disposal systems can produce pieces of ground fish carcasses having a size that will prevent return of the fish carcass pieces to the banks along the body of water, thereby ensuring that important nutrients within the fish carcasses remain in the ecosystem. It is further contemplated that the described fish disposal systems can provide a completely sustainable source of power for the grinder, thereby providing anglers with a fully reliable and readily available means for disposing of fish carcasses.

Although several embodiments of the invention have been disclosed in the foregoing specification, it is understood by those skilled in the art that many modifications and other embodiments of the invention will come to mind to which the invention pertains, having the benefit of the teaching presented in the foregoing description and associated drawings. It is thus understood that the invention is not limited to the specific embodiments disclosed hereinabove, and that many modifications and other embodiments are intended to be included within the scope of the appended claims. Moreover, although specific terms are employed herein, as well as in the claims which follow, they are used only in a generic and descriptive sense, and not for the purposes of limiting the described invention, nor the claims which follow.

What is claimed is:

1. A fish disposal system comprising:
a paddlewheel configured for flotation within a body of water, the paddlewheel having a wheel portion configured for rotation about a rotation axis in response to current flow within the body of water; and
a grinder having a plurality of cutting elements, each cutting element of the plurality of cutting elements being configured for rotation about a respective grinding axis, the plurality of cutting elements being coupled to the paddlewheel such that rotation of the wheel portion of the paddlewheel about the rotation axis effects a corresponding rotation of each cutting element of the plurality of cutting elements about its respective grinding axis, wherein the plurality of cutting elements define a grinding zone configured to receive one or more fish carcasses and an exit zone configured to receive pieces of the ground fish carcasses, the exit zone being in fluid communication with the body of water.

2. The fish disposal system of claim 1, wherein the wheel portion of the paddlewheel is mechanically coupled to the plurality of cutting elements of the grinder through a gear assembly.

3. The fish disposal system of claim 1, wherein the grinder comprises a housing having an inlet and an outlet, the inlet of the housing of the grinder being in communication with the grinding zone of the plurality of cutting elements, the outlet of the housing of the grinder being in communication with the exit zone of the plurality of cutting elements.

4. The fish disposal system of claim 1, further comprising a hopper having an inlet and an outlet, the inlet of the hopper being configured to receive the one or more fish carcasses, the outlet of the hopper being in communication with the grinding zone of the plurality of cutting elements of the grinder.

5. The fish disposal system of claim 4, wherein the inlet of the hopper is configured to permit concurrent entry of a selected number of fish carcasses into the hopper.

6. The fish disposal system of claim 4, further comprising a slide element having an inlet portion and an outlet portion, the outlet portion of the slide element being coupled to the inlet of the hopper, the inlet portion of the slide element configured to receive the one or more fish carcasses.

7. The fish disposal system of claim 6, wherein the inlet portion of the slide element is configured for secure attachment to a stationary object positioned on a bank proximate the body of water.

8. The fish disposal system of claim 1, wherein the paddlewheel comprises a plurality of pontoons.

9. The fish disposal system of claim 8, wherein the grinder is secured to at least one pontoon of the plurality of pontoons.

10. The fish disposal system of claim 1, wherein the paddlewheel is configured for coupling to a bank proximate the body of water.

11. The fish disposal system of claim 10, wherein the grinder is configured for coupling to the bank proximate the body of water.

12. The fish disposal system of claim 1, wherein the paddlewheel comprises a water pump assembly configured to pump water to the grinding zone of the plurality of cutting elements of the grinder.

13. The fish disposal system of claim 6, wherein the paddlewheel comprises a water pump assembly configured to pump water to the slide element.

14. The fish disposal system of claim 1, wherein the wheel portion of the paddlewheel is selectively removable from the body of water to permit access to the grinder.

15. The fish disposal system of claim 1, wherein the plurality of cutting elements are positioned in an interleaved configuration.

16. The fish disposal system of claim 1, further comprising an electrical generator operatively coupled to the wheel portion of the paddlewheel and the plurality of cutting elements of the grinder, wherein the electrical generator is configured to translate the rotational motion of the wheel portion of the paddlewheel into electricity, and wherein the electrical generator is configured to deliver the electricity to the grinder.

17. A fish disposal system comprising:
a paddlewheel configured for flotation within a body of water, the paddlewheel having a wheel portion configured for rotation about a rotation axis in response to current flow within the body of water;
an electrical generator operatively coupled to the wheel portion of the paddlewheel, the electrical generator configured to translate the rotational motion of the wheel portion of the paddlewheel into electricity; and
a grinder having a plurality of cutting elements, each cutting element of the plurality of cutting elements configured for rotation about a respective grinding axis, the plurality of cutting elements being electrically coupled to the electrical generator, wherein the plurality of cutting elements define a grinding zone configured to receive one or more fish carcasses and an exit zone configured to receive pieces of the ground fish carcasses, the exit zone being in fluid communication with the body of water.

18. The fish disposal system of claim 17, further comprising a water pump assembly configured to pump water to the grinding zone of the plurality of cutting elements of the grinder.

19. The fish disposal system of claim 17, further comprising:
a hopper having an inlet and an outlet, the inlet of the hopper being configured to receive the one or more fish carcasses, the outlet of the hopper being in communication with the grinding zone of the plurality of cutting elements of the grinder,
wherein the grinder comprises a housing having an inlet and an outlet, the inlet of the housing of the grinder being in communication with the grinding zone of the plurality of cutting elements, the outlet of the housing of the grinder being in communication with the exit zone of the plurality of cutting elements.

20. A method of disposing of fish within a body of water, comprising:
positioning a paddlewheel within the body of water, the paddlewheel having a wheel portion configured for rotation about a rotation axis in response to current flow within the body of water, the wheel portion of the paddlewheel being operatively coupled to a plurality of cutting elements of a grinder such that rotation of the wheel portion of the paddlewheel about the rotation axis effects a corresponding rotation of each cutting element of the plurality of cutting elements about its own respective grinding axis; and
delivering one or more fish carcasses to a grinding zone defined by the plurality of cutting elements of the grinder, wherein the plurality of cutting elements define an exit zone configured to receive pieces of the ground fish carcasses, the exit zone being in fluid communication with the body of water.

* * * * *